UNITED STATES PATENT OFFICE.

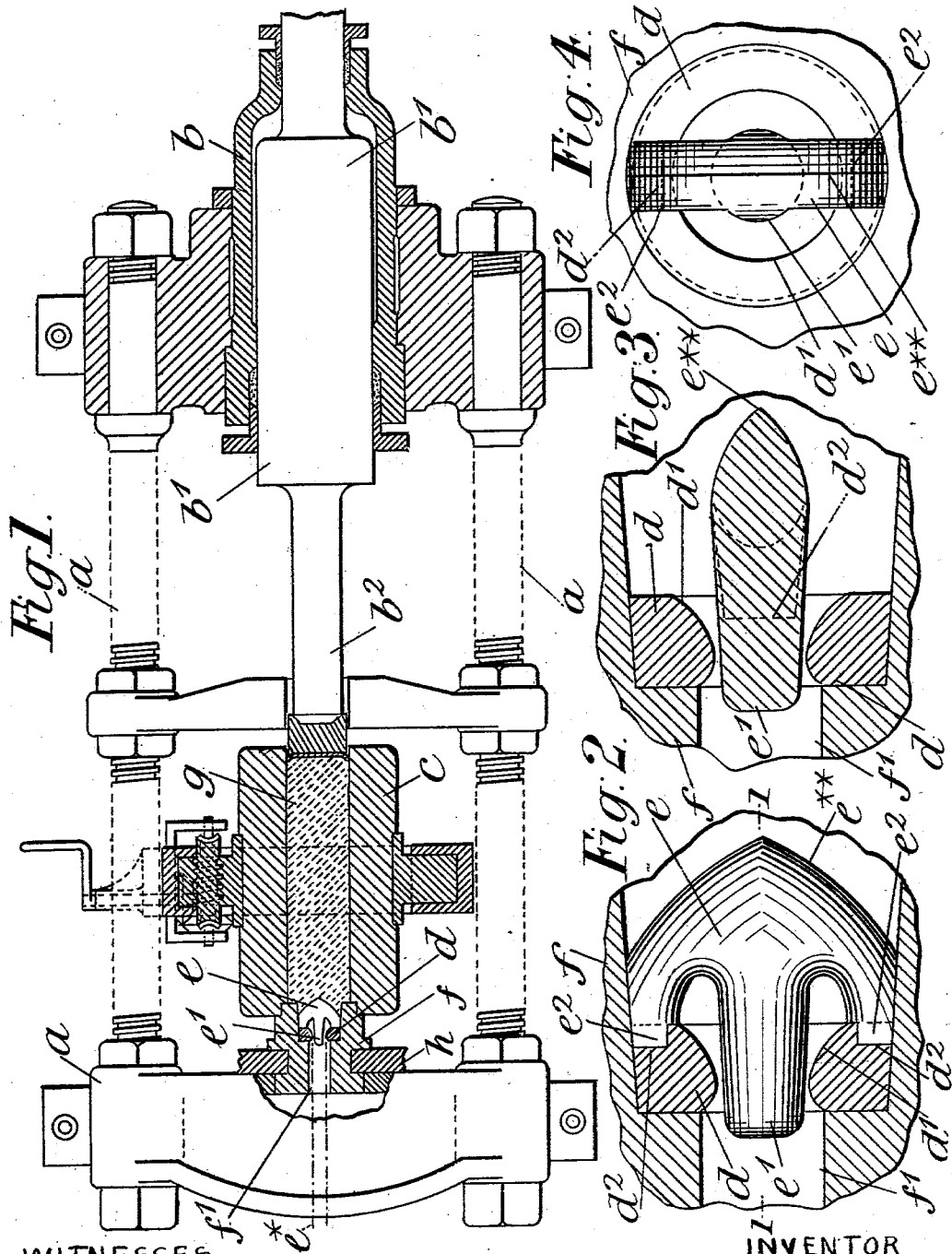

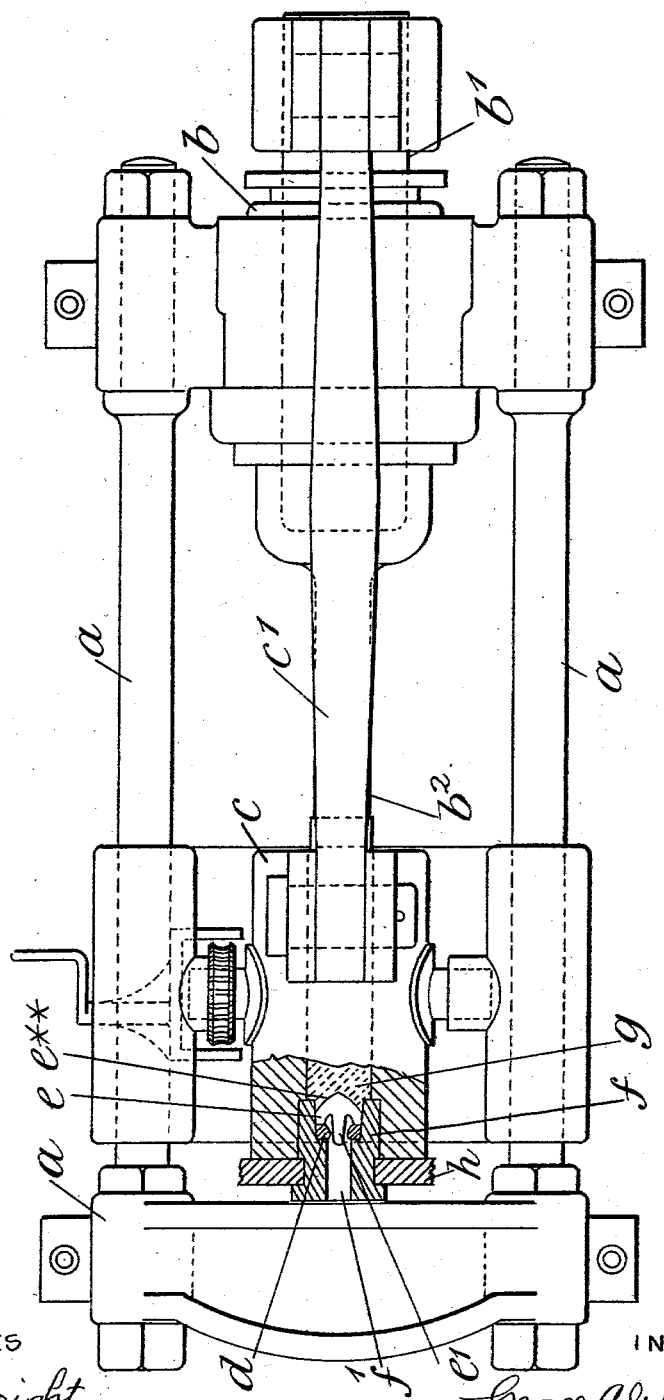

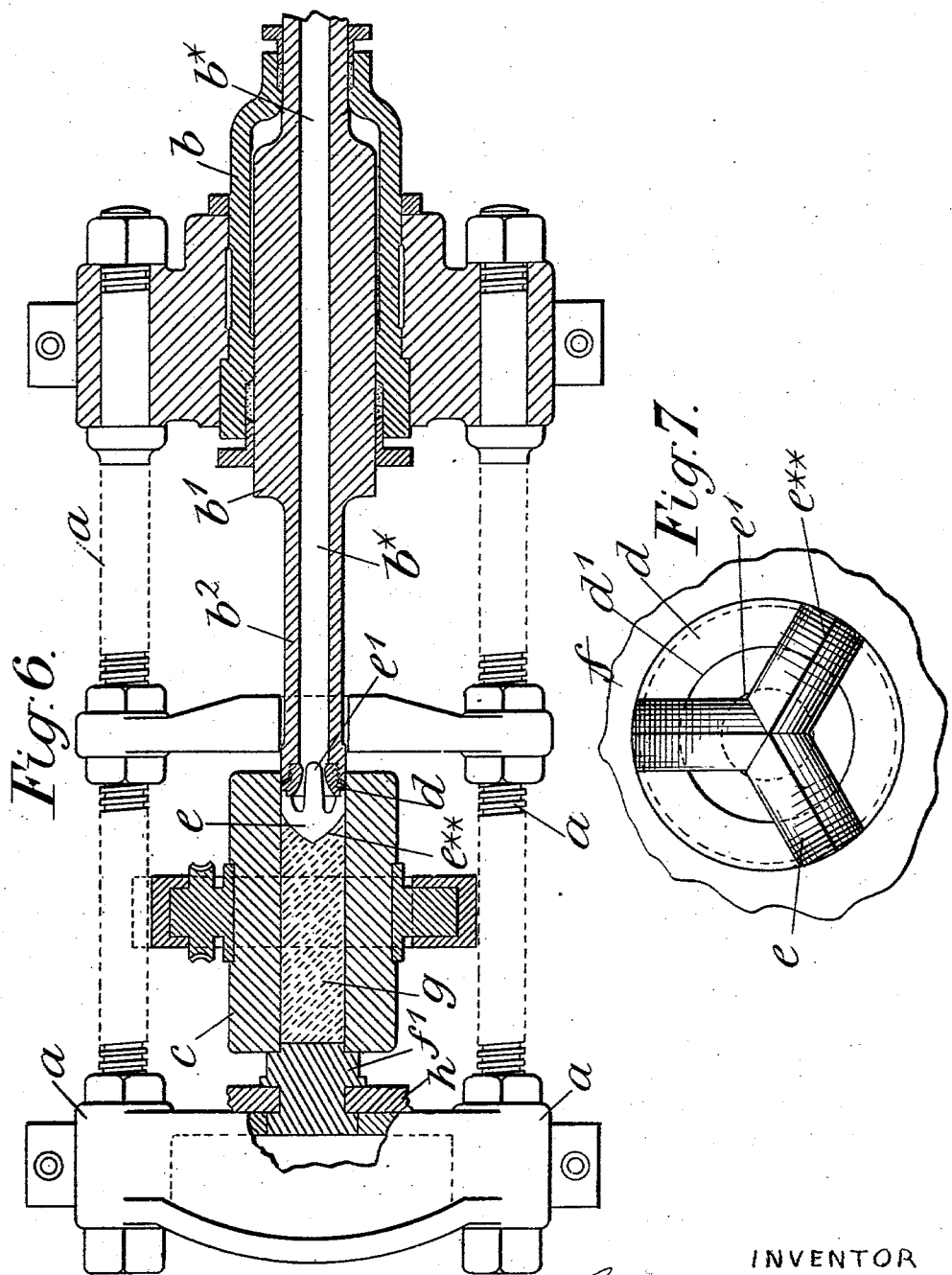

GEORGE ALEXANDER DICK, OF LONDON, ENGLAND, ASSIGNOR TO THE AMERICAN BRASS COMPANY, OF WATERBURY, CONNECTICUT.

MANUFACTURE OF VARIOUS ARTICLES FROM COPPER OR COPPER ALLOYS.

SPECIFICATION forming part of Letters Patent No. 715,358, dated December 9, 1902.

Application filed July 20, 1897. Serial No. 645,281. (No specimens.)

*To all whom it may concern:*

Be it known that I, GEORGE ALEXANDER DICK, engineer, a subject of the Queen of Great Britain, residing at No. 110 Cannon street, in the city of London, England, have invented certain new and useful Improvements in the Manufacture of Various Articles from Copper or Copper Alloys, of which the following is a specification.

I will now proceed to describe my said invention with reference to the accompanying drawings and to the letters marked thereon, in which—

Figure 1 is a horizontal section of an apparatus suitable for carrying the invention into effect. Fig. 2 is a detail view of the girder, mandrel, and die and aperture of the pressure-chamber separately. Fig. 3 is a longitudinal section taken on the line 1 1 of Fig. 2. Fig. 4 is an end view of Fig. 2. Fig. 5 is a plan representing a modified form of apparatus. Fig. 6 is a horizontal section representing a further modification in the general apparatus, and Fig. 7 is an end view of a modified form of girder for supporting the mandrel.

In the several figures, in which like parts are indicated by similar letters of reference, Figs. 2, 3, 4, and 7 are drawn to an increased scale with respect to the other figures of the drawings.

The invention relates to the manufacture of hollow bars of various sections, tubes, and various other articles from copper and such copper alloys as become plastic and malleable at a temperature of about 800° to 900° Fahrenheit by squirting, squeezing, or pressing the same while in a plastic condition through a die, in connection with which a mandrel is arranged.

It has before been proposed to manufacture tubes and other articles for the production of which a mandrel is required by squirting, squeezing, or pressing copper or alloys thereof while in a heated and plastic state through a die; but for this purpose a long mandrel passing into the die has been employed, the said mandrel being either carried by and traveling with a ram or plunger working within a pressure-chamber containing the heated metal and employed to exert the necessary force thereon or fixed outside the pressure-chamber and projecting into the die. This long mandrel (which necessarily became highly heated) owing to its being unsupported at one end and to the great pressure exercised by the ram during the squirting or squeezing operation was unsteady and when carried by the plunger became elongated and drawn out of shape, thus rendering the operation useless for practical purposes. Some of these objections applied to the employment of a mandrel fixed outside the chamber beyond the die and extending into the latter, in addition to which in this case the length of tube was necessarily limited to the length of the mandrel.

Hitherto it has been considered necessary in order to produce a tube or like article from plastic copper or copper alloys by squirting or squeezing the same through a die that the mass of copper or alloy acted upon should not be cut or divided or otherwise interrupted in its passage to the die, but that the metal must be forced directly into the die and around the mandrel, so that the tube or other article may be produced uninterruptedly from the homogeneous mass.

Now I have discovered that a body of copper or copper alloys of the nature above stated in a heated and plastic state may be divided in its passage to the die, and if the temperature be maintained and air excluded, so as to prevent the surfaces of the parts becoming oxidized, the two parts of the divided metal will when brought together under pressure unite and form one solid mass without risk of separation at the joint, and this discovery I utilize in the manufacture of bars, tubes, and other hollow articles in the following way:

In the drawings I have given several examples of apparatus suitable for carrying my invention into effect, and I will now proceed to describe my invention in connection therewith.

Referring to Figs. 1 to 4, $a$ represents a strong frame. $b$ represents a hydraulic cylinder. $b'$ represents the ram. $b^2$ represents an extension of the ram, which I call a "plunger." $c$ represents a pressure-chamber or container of any suitable well-known construction designed to resist the extreme degree of heat and heavy pressure to which it is subjected in the operation hereinafter described, and $g$ represents the plastic metal contained within the pressure-chamber $c$.

The pressure-chamber or container $c$, which is open-ended at one end thereof, is provided with a die-holder $f$, formed with an orifice $f'$, through which the formed tube or the like is forced, and $e^*$ represents such tube issuing therefrom.

Within the die-holder $f$ is received a die $d$, adapted to impart the desired form to the issuing tube or the like, while the necessary pressure to force the plastic metal $g$ through the die $d$ is obtained from the plunger $b^2$, which works within the pressure-chamber or container $c$, and the die-holder $f$ and die $d$ are held in place by means of separate jaws $h$.

Within the pressure-chamber or container $c$, in connection with the die $d$, is employed a short mandrel $e'$, which is carried by a bridge or girder $e$, which is supported by the die $d$, as represented in the drawings, or it might be otherwise supported, as will be readily understood.

The bridge or girder $e$ for the purpose of strength in elevation is shaped to the form of two intersecting arcs of circles, while in transverse section, as shown more particularly in Fig. 3, on its acting face it is beveled, so as to present a sharp or more or less rounded edge to the advancing plastic mass of copper or alloy $g$, while the mandrel $e'$ is formed or fixed on the rear side thereof or is otherwise arranged in connection with the rear or thickened side of the bridge or girder $e$ and extends into the opening $d'$ of the die $d$.

The girder $e$ may with advantage be formed at the extreme points $e^2$ of its base to enter into corresponding notches or recesses $d^2$, formed in the die $d$, or it may be formed to the arc of the interior of the die-holder $f$ or of the pressure-chamber $c$ or otherwise arranged so that when it is placed in position it will at once centralize itself and the mandrel $e'$ with relation to the die $d$.

A body of metal $g$ in a sufficiently-heated state placed within the pressure-chamber or container $c$ and forced forward by the plunger or piston $b^2$ will on meeting the sharp edge $e^{**}$ of the girder $e$ become divided into two parts, and upon entering the die $d$, which is formed with a beveled, flared, or rounded mouth $d'$ to facilitate the entry thereof, the two parts will be pressed around the mandrel $e'$ and the freshly-divided surfaces of the plastic metal $g$ will be brought together under great pressure, and will thereby be caused to be firmly welded together or united in such manner that it will be difficult or impossible to discover the point of junction in the finished article.

It will be understood that the copper or alloy $g$ must be maintained in the required plastic condition until the parts have united in the manner hereinbefore described.

The surfaces of the divided mass of plastic copper or alloy $g$ while separated by the bridge or girder $e$ are in close contact therewith and are more or less protected from atmospheric influence, while immediately that they pass beyond the bridge or girder $e$ they are forced closely around the mandrel $e'$ and together by the peculiar formation of the mouth $d'$ of the die $d$, while the advancing metal closely fills the die around the mandrel $e'$, and thereby completely excludes atmospheric air, and as after the first entry of the metal into the die the divided parts are not exposed to atmospheric influence no oxidation of the surfaces thereof can take place to interfere with the successful uniting thereof.

In the example given at Fig. 5 the arrangement of the die and girder $e$ and mandrel $e'$ is substantially the same as that lastly hereinbefore described; but in this case instead of the pressure-chamber or container $c$ being held stationary while the plunger or piston $b^2$ advances into the same the pressure-chamber or container $c$ is mounted with capability of sliding upon the frame $a$, the plunger or piston $b^2$ is stationary, and the container or pressure-chamber $c$ is by a link $c'$ connected with the hydraulic ram $b'$, the action of which is in the reverse direction to that represented in Fig. 1; but in other respects the action of the device is substantially the same as that hereinbefore described.

In the example given at Fig. 6 instead of forming an opening $c'$ at the end of the pressure-chamber or container $c$ such end thereof is closed and the die $d$ and girder $e$ and mandrel $e'$ are carried by the end of the plunger $b^2$, and the plunger $b^2$ and ram $b'$ are in this case formed with a hollow $b^*$ therethrough to allow of the passage of the tube or other article formed by the die in the advance of the plunger $b^2$.

In the example given at Fig. 7 the girder $e$ instead of being formed in one span is provided with three arms radiating from the mandrel $e'$, or it might be otherwise formed.

By the means hereinbefore described tubes or the like of copper or copper alloys may be produced rapidly, accurately, and economically, and the length thereof is merely governed by the quantity of plastic metal within the container or pressure-chamber $c$, while inasmuch as the process is effected under great pressure it is possible to manufacture tubes or the like of great strength and without any perceptible joint in the finished tube.

I am aware that apparatus similar to that hereinbefore described has been employed in the manufacture of pipes from lead, and I would therefore have it understood that I make no claim to such apparatus, which is herein shown and described merely as a convenient means for carrying my invention into effect.

Having now particularly described and ascertained the nature of my said invention and in what manner the same is to be performed, I declare that what I claim is—

1. The process of making hollow bars, tubes and other tubular articles of copper or copper alloys consisting in heating the copper or copper alloy to a high temperature, substantially such as specified, and then forcing the same, in its heated and plastic condition from a pressure-chamber through a die and around a short mandrel thereat, cutting or dividing the metal during its passage to the die, protecting the cut surfaces from contact with the air and bringing such surfaces together again while so protected, in the die, under heavy pressure, so that they may again unite.

2. The herein-described process of manufacturing tubes or other hollow or tubular articles of copper or copper alloys, consisting in heating the copper or copper alloy to a temperature less than the melting-point substantially as specified and such as I have ascertained and discovered will permit a body of such material to be cut and reunited, if not exposed to oxidation, into a continuous and homogeneous mass; and then forcing the heated and plastic material from a pressure-chamber around a short mandrel through a die, cutting or dividing the metal during its passage to or into the die, protecting the cut surfaces from contact with the air to prevent oxidation, and bringing such surfaces together again while so protected, in the die, with the temperature maintained, and under heavy pressure, so that they may again unite to form a homogeneous and seamless tube or other hollow article, substantially in the manner set forth.

GEORGE ALEXANDER DICK.

Witnesses:
   GEO. E. VAUGHAN,
   ALFRED GERALD FOOKS.